Patented June 30, 1931

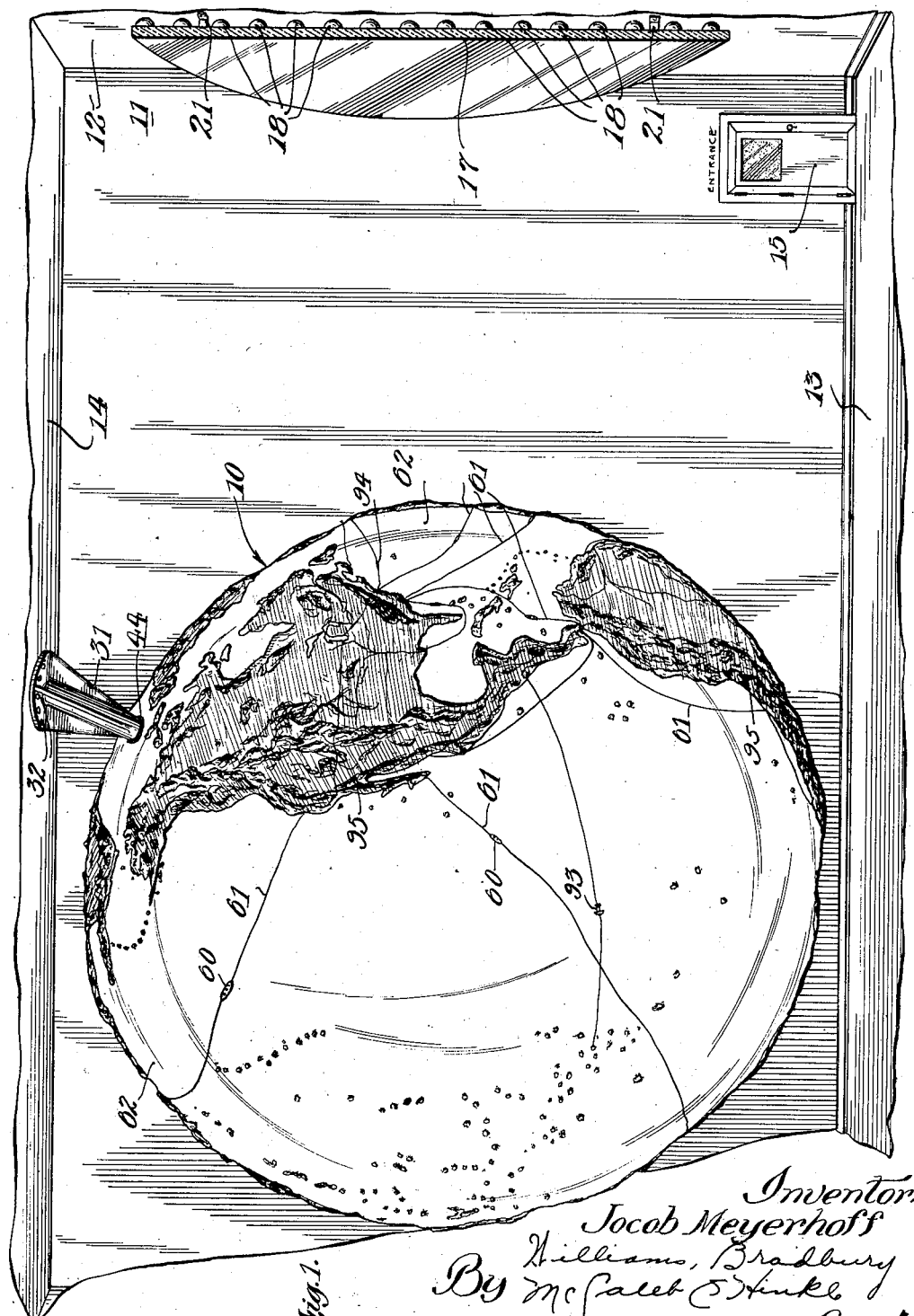

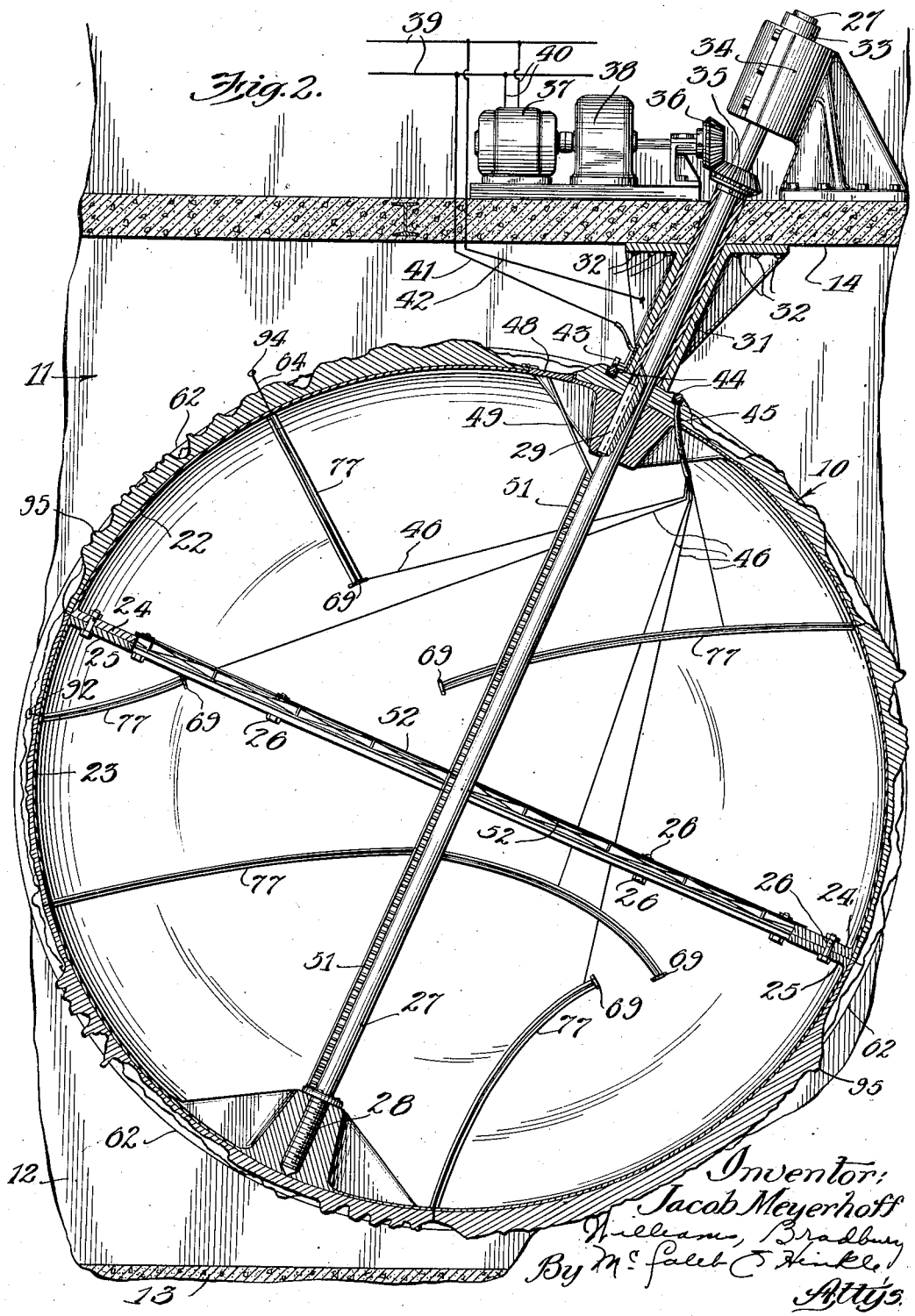

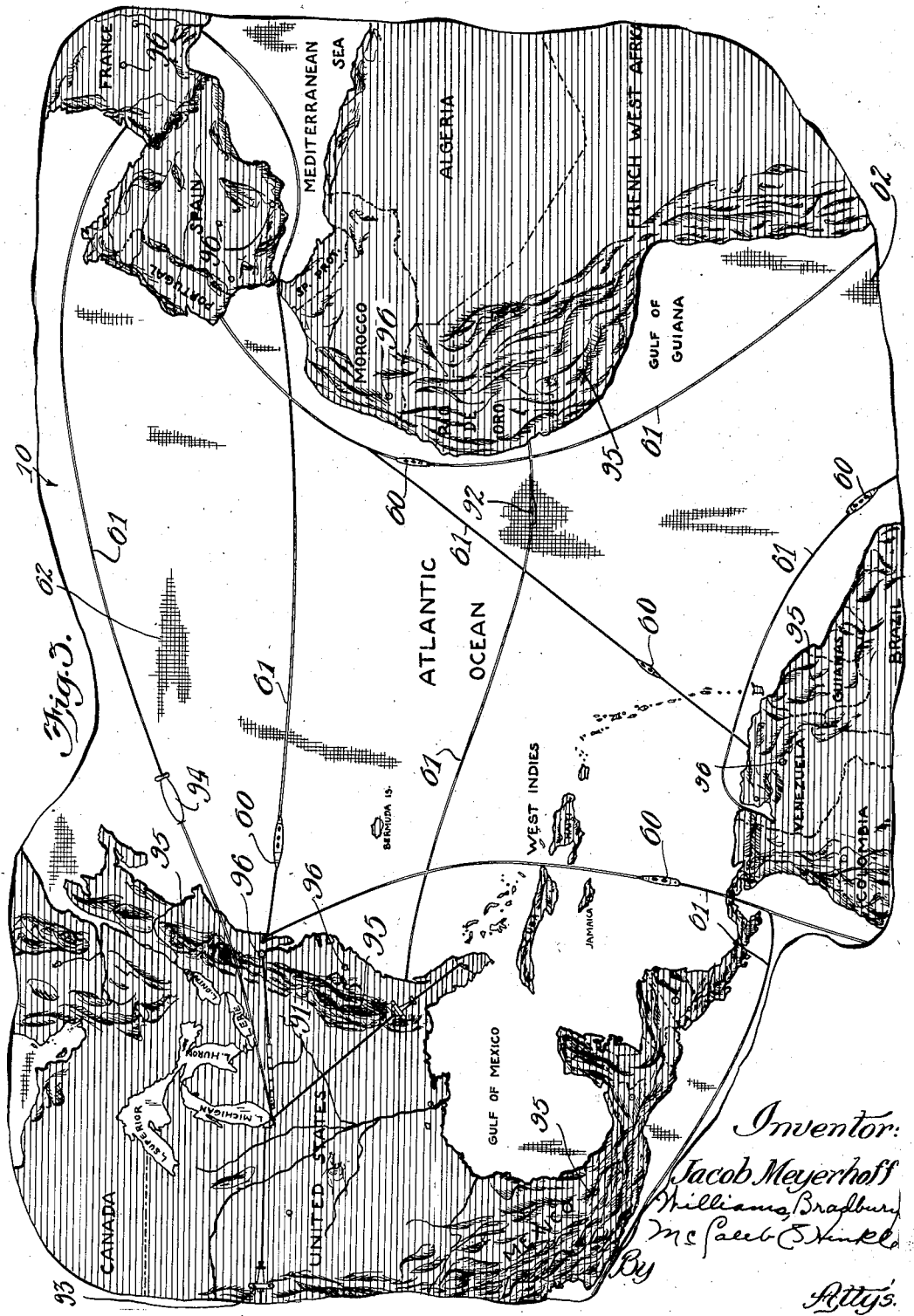

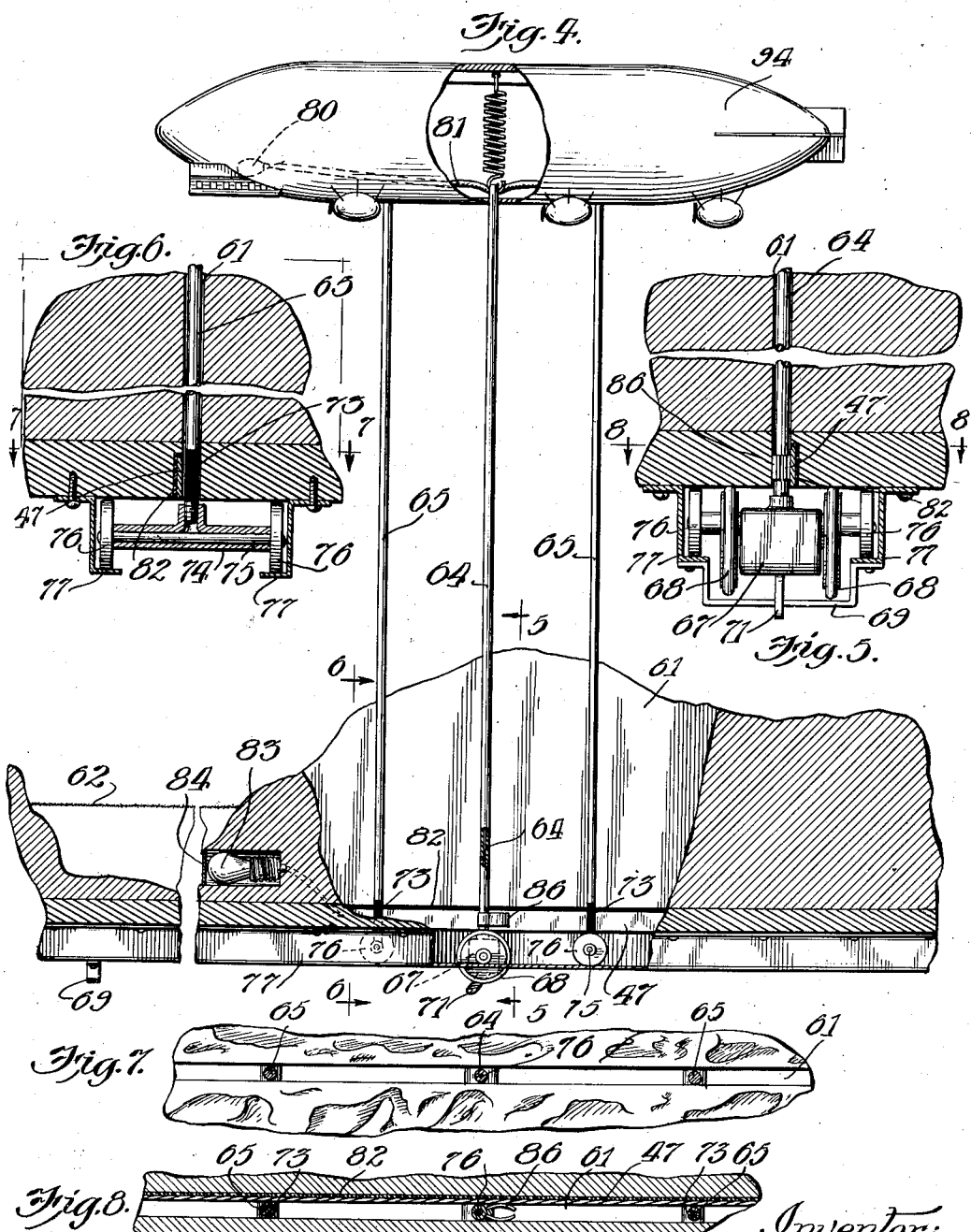

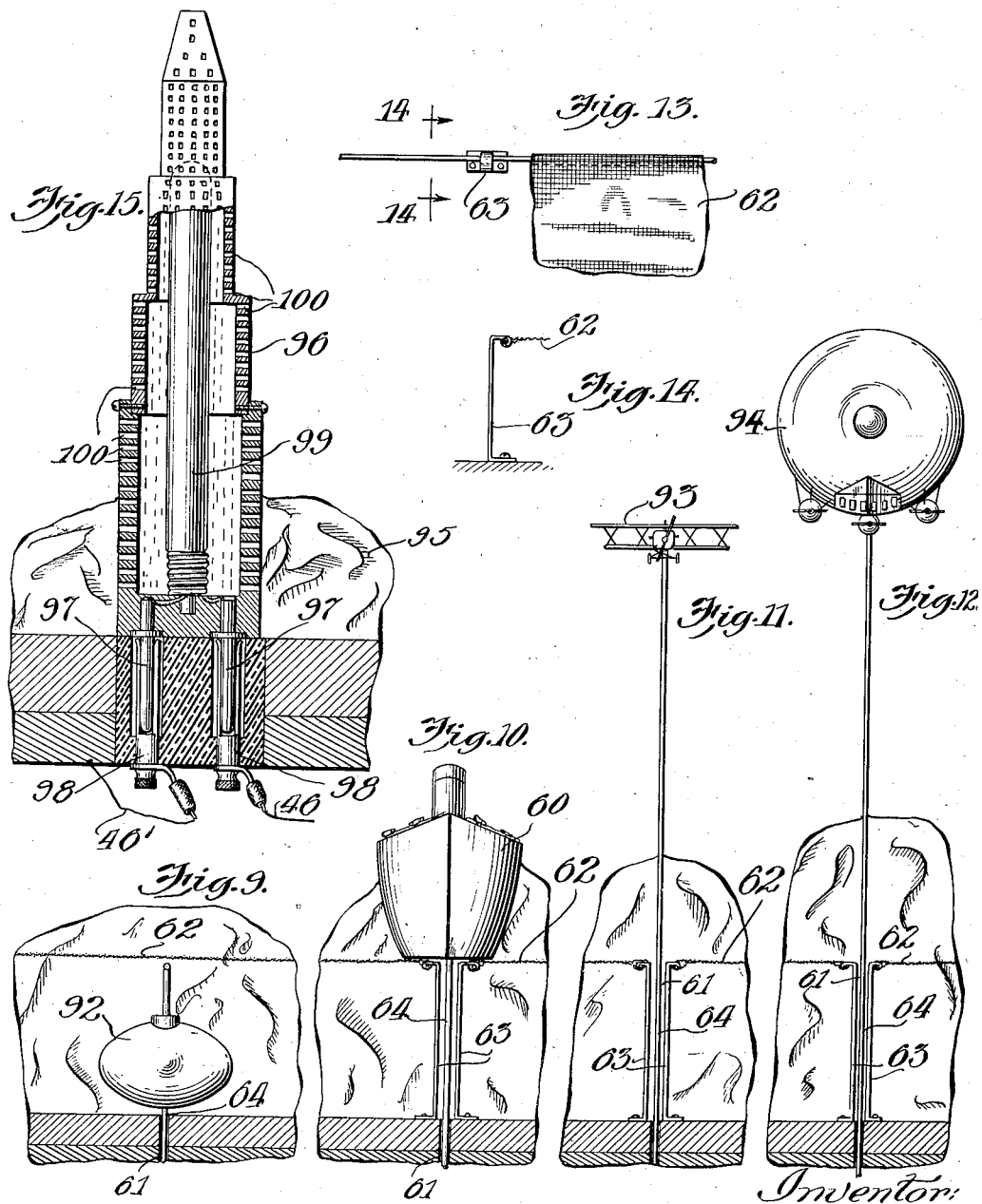

1,812,110

UNITED STATES PATENT OFFICE

JACOB MEYERHOFF, OF CHICAGO, ILLINOIS

EDUCATIONAL DEVICE

Application filed August 13, 1930. Serial No. 474,899.

This invention relates to an educational device. It may be explained as embodied in a globe representing the earth, together with other mechanism appropriately associated therewith for producing a substantially natural demonstration.

An object of my invention is the provision of mechanism by which demonstration may be given to simulate the rotation of the earth, its relation to the sun and the manner of causing day and night by the sun.

Another object is the provision of such a mechanism by which the relative positions and movements of objects on the earth, or held by the force of gravity thereof appear from points other than on the earth.

Other objects will become apparent from the following description.

In the accompanying drawings illustrating one specific embodiment of my invention:

Figure 1 is a perspective view of a large room containing a globe and a source of light simulating the sun;

Figure 2 is a somewhat enlarged vertical section taken substantially on the axis of rotation of the globe shown in Figure 1 and additionally illustrating the driving mechanism for rotating the globe;

Figure 3 is an enlarged fragmentary elevation of a section of the globe containing the representation of the Atlantic Ocean and portions of the adjacent continents;

Figure 4 is an enlarged vertical section of a fragment of the globe's exterior portion and illustrating an object which is movably attached to the globe in simulation of an automotive object;

Figure 5 is a vertical sectional view on a larger scale taken on the line 5—5 of Figure 4;

Figure 6 is also a vertical sectional view on a larger scale taken on the line 6—6 of Figure 4;

Figure 7 is a horizontal section taken on the line 7—7 of Figure 6;

Figure 8 is a horizontal section taken on the line 8—8 of Figure 5.

Figures 9, 10, 11 and 12 are similar vertical sections through fragments of portions of the globe's surface simulating the ocean and illustrating the manner in which various types of automotive objects are supported and moved about when considered together with Figures 4 to 8 inclusive;

Figure 13 is a fragmentary plan view of a portion of the covering simulating the surface of bodies of water and illustrating the means of supporting the same;

Figure 14 is a vertical section taken on the line 14—14 of Figure 13; and

Figure 15 is a much enlarged vertical section through a relatively stationary object simulating a building which is detachably fixed to the surface of the globe and is arranged to be lighted by electricity.

Referring first to Figures 1 and 2, the globe designated as a whole by the numeral 10 is of relatively great dimensions and may be housed within a room-like enclosure 11 having walls 12, a floor 13 and a ceiling 14. An entrance door 15 of usual dimensions may be employed for gaining access to the room. At one end of the room is secured a relatively large and thick sheet of glass 17 which is preferably of such color and construction as to emit a soft diffused light when the electric light bulbs 18 positioned between the glass 17 and the wall 12 are lighted. The glass 17 may be suitably fixed to the wall 12 as by brackets 21.

The globe 10 is constructed of a plurality of sections 22 and 23 which may be of any suitable material, preferably of relatively light metal, which portions include inwardly extending flanges 24 and 25 which are bolted together by bolts 26. The globe is fixed to an inclined shaft 27 by threaded engagement at 28 and by means of a key 29. The shaft 27 passes through a bearing bracket 31 fixed to the ceiling of the room 14 by bolts 32. The upper end of the shaft 27 is provided with a thrust collar 33 engaging the upper side of the journal box 34 through which the shaft extends. The collar 33 supports the weight of the globe and prevents downward movement of the shaft through its bearings. The shaft 27 is provided with a bevelled gear 35 which intermeshes with a pinion 36, the latter of which is driven by an electric motor 37 through suitable gear reduction mechanism 38.

The motor 37 is supplied by electric power from the feed line 39 through conductors 40. Conductors 41 and 42 leading from the line 39 supply current to the various objects on the globe hereinafter described more in detail. The conductor 41 is provided with a brush 43 which brush engages a slip ring 44 on the upper end of the globe which is insulated from the metal of the globe and to which is attached a cable 45 comprising a plurality of conductors 46. The conductors 46 supply electric current to bar conductors 47 as shown in Figures 4, 5, 6 and 8.

In order to gain access to the globe I have provided a trap door 48 and a ladder or the like 49 extending from the vicinity of the trap door to the shaft 27. I have also provided a ladder 51 by which one can descend to the lower end of the globe for purposes of repairing the same. There is also provided a bridge construction 52 by which one can pass from the flanges 24 to the shaft 27 without descending to the lower part of the globe.

Referring now to Figure 3 which is an enlarged fragment of a portion of the globe, I have illustrated a number of ocean steamers 60 which are adapted to be moved along predetermined paths 61 which are defined by the adjacent edges of the transparent gauze or like material 62 which is supported above the ocean bed by spacing elements 63, which elements are spaced apart sufficiently to permit the passage of the supporting rods 64 therebetween as best shown in Figures 9 to 14 inclusive. The various objects simulating automotive objects in Figures 9, 10, 11 and 12 are supported and propelled in the same manner and as more particularly shown in Figures 4 to 8 inclusive. The main supporting rods 64 are supplemented by rods 65. At the lower end of the rod 64 are fixed small electric motors 67 which have rubber tired wheels 68 on the opposite ends of the armature shaft. The wheels 68 engage the inner surface of the globe and by friction therewith cause the movable objects attached thereto to move along the paths 61. Adjacent the ends of each path 61 is provided a cross bar 69 which is engaged by a reversing switch 71 for reversing the motor 67 and causing it to propel the object attached thereto to the opposite end of the pathway 61. The rods 65, as shown in Figure 6, are provided with sleeve-like insulators 73 to prevent the conductor 47 engaging the same. The rods 65 have attached to their lower ends brackets 74 containing axles 75 on which are secured wheels 76 engaging the trackway 77 to aid in guiding the movable objects and for providing a return for electricity which supplies energy to the sources of light such as the light bulb 80 through the conductor 81 which passes upwardly through the main supporting rods 64. The conductors 47 are preferably insulated from the metal of the globe by insulators 82.

The portions of the globe surface which are beneath the transparent gauze coverings 62 may be colored by means of paint or dye to have a blue appearance and this blue appearance may be increased by the use of a concealed electric light 83 which emits light through a blue glass 84 onto the surface of the globe beneath the gauze 62. For the purpose of supplying electric power from the conductors 47 to the motors 67 I have provided spring contacting elements 86, one of which frictionally engages the conductor 47 and receives current therefrom which is transmitted directly to the motor 67. I have designated the steamships by the numeral 60 and the other automotive objects which are similarly supported and controlled may be designated by numerals 91, 92, 93 and 94 which respectively represent railway trains, submarines, aeroplanes and dirigibles.

The mountain ranges 95 may also be constructed as nearly as possible to simulate the actual construction of the earth and the various islands and continents may be likewise formed. Certain permanent constructions, such as buildings 96, are provided which buildings are preferably removably fixed in position by prongs 97 which engage the sockets 98 from which they receive electric current for the light bulb 99 for illuminating the buildings so that light may be seen from without through the windows 100. Electric current for the bulb 99 may be supplied through a conductor 46 and in return passes through the conductor 46' which may be grounded to the metal of the globe and returned to the power line through the bracket 31 and a conductor 42.

Although I have described my invention as embodied in the specific form illustrated in the drawings it will be understood that it is susceptible of modification without departing from the spirit of the invention and I desire to avail myself of such modifications as come within the scope of the appended claims.

I claim as my invention:

1. In an educational device in combination a globe simulating the earth, means for supporting and rotating said globe on an inclined axis, a relatively large source of light simulating the sun to produce the appearance of day and night on said globe upon rotation of the same, said globe having an irregular surface simulating the surface of the earth and bed of the ocean, means for causing the surface simulating the ocean bed to appear blue, means simulating automotive objects movably mounted on the globe and positively driven means for moving said objects along predetermined paths.

2. In an educational device in combination a globe simulating the earth, means for supporting and rotating said globe on an inclined axis, a relatively large source of light simulating the sun to produce the appearance of day and night on said globe upon rotation of the same, said globe having an irregular surface simulating the surface of the earth and bed of the ocean, means for causing the surface simulating the ocean bed to appear blue, means simulating automotive objects movably mounted on the globe, means for moving said objects along predetermined paths, transparent means simulating a surface of bodies of water and means securing said transparent means in spaced relation to portions of the globe simulating the bed of the ocean.

3. In an educational device of the class described, a globe simulating the earth, said globe having an irregular surface simulating the surface of the earth and bed of the ocean, and transparent means simulating the surface of bodies of water mounted in spaced relation with portions of the surface of the globe.

4. In an educational device of the class described, a globe simulating the earth, said globe having an irregular surface simulating the surface of the earth and bed of the ocean, transparent means simulating the surface of bodies of water mounted in spaced relation with portions of the surface of the globe and means for causing the portions of the globe surface beneath transparent means to appear blue.

5. In an educational device of the class described, a globe simulating the earth, said globe having an irregular surface simulating the surface of the earth and bed of the ocean, transparent means simulating the surface of bodies of water mounted in spaced relation with portions of the surface of the globe and concealed sources of light on said globe adapted to direct colored rays of light onto the surface of the globe beneath said transparent means to give the appearance of color thereto.

6. In an educational device of the class described, a globe simulating the earth, said globe comprising a plurality of hollow sections which when fitted together form a hollow globe including a relatively thin shell-like exterior, the exterior of said globe including irregular surface formations simulating the earth's surface, objects on said globe simulating automotive objects secured thereto for movement along predetermined paths and positive means for moving said objects.

7. In an educational device of the class described, a globe of substantially spherical form, said globe comprising a plurality of hollow sections which when fitted together form a hollow globe including a relatively thin shell-like exterior, the exterior of said globe including irregular surface formations simulating the earth's surface, means for causing portions of the surface of the globe simulating the ocean to appear colored, objects on said globe simulating automotive objects secured thereto for movement along predetermined paths and positive means for moving said objects.

8. In an educational device of the class described, a globe, said globe comprising a plurality of hollow sections which when fitted together form a hollow globe including a relatively thin shell-like exterior, the exterior of said globe including irregular surface formations simulating the earth's surface, portions of which are depressed to simulate the bed of bodies of water, means for causing the depressed portions to appear blue, and transparent coverings for the depressed portions simulating the surface of bodies of water.

9. In an educational device of the class described, a globe, said globe comprising a plurality of hollow sections which when fitted together form a hollow globe including a relatively thin shell-like exterior, the exterior of said globe including irregular surface formations simulating the earth's surface, portions of which are depressed to simulate the bed of bodies of water, means for causing the depressed portions to appear blue, transparent coverings for the depressed portion simulating the surface of bodies of water, and objects on said globe simulating automotive objects secured thereto for movement along predetermined paths and means for moving said objects.

10. In an educational device of the class described, a globe simulating the earth, said globe having an irregular surface simulating the surface of the earth and bed of the ocean, transparent means simulating the surface of bodies of water mounted in spaced relation with portions of the surface of the globe, and movable objects arranged between said transparent means and the surface of the globe.

11. In an educational device of the class described, a globe simulating the earth, said globe having an irregular surface simulating the surface of the earth and bed of the ocean, transparent means simulating the surface of bodies of water mounted in spaced relation with portions of the surface of the globe, and positively driven objects arranged between said transparent means and the surface of the globe.

12. In an educational device of the class described, a globe simulating the earth, said globe having an irregular surface simulating the surface of the earth and bed of the ocean, transparent means simulating the surface of bodies of water mounted in spaced relation with portions of the surface of the globe, movable objects arranged between said transparent means and the surface of the globe and other movable objects arranged above the exterior surface of said transparent means.

13. In an educational device in combination a globe simulating the earth, means for supporting and rotating said globe on an inclined axis, a relatively large source of light simulating the sun to produce the appearance of day and night on said globe upon rotation of the same, said globe having an irregular surface simulating the surface of the earth and bed of the ocean, means for causing the surface simulating the ocean bed to appear blue, means simulating automotive objects movably mounted on the globe, means for moving said objects along predetermined paths, transparent means simulating a surface of bodies of water, means securing said transparent means in spaced relation to portions of the globe simulating the bed of the ocean, and means simulating automotive objects movably mounted between said transparent means and the surface of said globe.

14. In an educational device of the class described, a globe, said globe comprising a plurality of hollow sections which when fitted together form a hollow globe including a relatively thin shell-like exterior, the exterior of said globe including irregular surface formations to simulate the bed of bodies of water, means for causing the depressed portions to appear blue, transparent coverings for the depressed portions simulating the surface of bodies of water, and objects on said globe simulating automotive objects secured thereto for movement along predetermined paths and electrically operated means for moving said objects.

15. In an educational device of the class described a globe, said globe comprising a plurality of hollow sections which when fitted together form a hollow globe including a relatively thin shell-like exterior, the exterior of said globe including irregular surface formations simulating the earth's surface, portions of which are depressed to simulate the bed of bodies of water, means for causing the depressed portions to appear blue, transparent coverings for the depressed portions simulating the surface of bodies of water, electrically operated objects on said globe simulating automotive objects secured thereto for movement along predetermined paths, immovably positioned objects simulating buildings and a source of light connected through the interior of said globe arranged to illuminate said buildings.

In witness whereof, I hereunto subscribe my name this 6th day of August, 1930.

JACOB MEYERHOFF.